United States Patent
Sun et al.

(10) Patent No.: US 12,112,173 B2
(45) Date of Patent: Oct. 8, 2024

(54) CONTEXT-BASED LOOP BRANCH PREDICTION

(71) Applicant: Intel Corporation, Santa Clara, CA (US)

(72) Inventors: Ke Sun, Portland, OR (US); Rodrigo Branco, Hillsboro, OR (US); Kekai Hu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 17/128,816

(22) Filed: Dec. 21, 2020

(65) Prior Publication Data
US 2022/0197660 A1     Jun. 23, 2022

(51) Int. Cl.
*G06F 9/38*     (2018.01)
*G06F 9/32*     (2018.01)

(52) U.S. Cl.
CPC .......... *G06F 9/3842* (2013.01); *G06F 9/325* (2013.01); *G06F 9/3806* (2013.01)

(58) Field of Classification Search
CPC ...... G06F 9/322; G06F 9/3832; G06F 9/3806; G06F 9/3842; G06F 9/325; G06F 9/3844
See application file for complete search history.

(56) References Cited

U.S. PATENT DOCUMENTS

| | | | | |
|---|---|---|---|---|
| 6,766,442 B1 * | 7/2004 | Kahle | ................... | G06F 9/3846 |
| | | | | 712/E9.047 |
| 7,136,992 B2 * | 11/2006 | Maiyuran | ............. | G06F 9/3844 |
| | | | | 712/240 |
| 8,904,155 B2 * | 12/2014 | Dieffenderfer | ........ | G06F 9/3848 |
| | | | | 712/240 |
| 2009/0055635 A1 * | 2/2009 | Tani | ..................... | G06F 9/30072 |
| | | | | 712/241 |
| 2018/0349144 A1 * | 12/2018 | Pal | ........................ | G06F 9/3848 |

FOREIGN PATENT DOCUMENTS

WO    WO-2021259443 A1 * 12/2021    ......... G06F 9/30065

OTHER PUBLICATIONS

S. Patil, N. B.Anne, U. Thirunavukkarasu and E. E. Regentova, Branch Prediction by Checking Loop Terminal Conditions, Information Systems: New Generations (ISNG) Conference Proceedings, pp. 2-7 (Year: 2005).*

* cited by examiner

*Primary Examiner* — Courtney P Spann
(74) *Attorney, Agent, or Firm* — Essential Patents Group, LLP

(57) ABSTRACT

An embodiment of an integrated circuit may comprise a branch predictor to predict whether a conditional branch is taken for one or more instructions, the branch predictor including circuitry to identify a loop branch instruction in the one or more instructions, and provide a branch prediction for the loop branch instruction based on a context of the loop branch instruction. Other embodiments are disclosed and claimed.

14 Claims, 18 Drawing Sheets

48 ⟶

Example Dispatcher Routine:

```
...
mov  rax, call_table_base_address
mov  rcx, subroutine_index
lea  rax, [rax + rcx*8]
call QWORD PTR [rax]
...
```

Data Access

Control Flow

➤ Subroutine #M:
<Code of Subroutine #M>

➤ Subroutine #N:
<Code of Subroutine #N>

Call Table (CT) of Subroutines:

| Address | Value |
|---|---|
| CT_base + 0 | Subroutine #0's address |
| CT_base + 1*8 | Subroutine #1's address |
| CT_base + 2*8 | Subroutine #2's address |
| ... | |
| CT_base + M*8 | Subroutine #M's address |
| ... | |
| CT_base + N*8 | Subroutine #N's address |

Example Function:

```
...
mov  rcx, argument_1
mov  rdx, argument_2
call QWORD PTR [IAT_entry_N]
...
...
...
mov  rcx, argument_1
mov  rdx, argument_2
call QWORD PTR [IAT_entry_N]
...
```

Data Access

➤ Function #N:
<Code of Function #N>

Control Flow

Import Addres Table(IAT):

| Address | Value |
|---|---|
| IAT_entry_A | Function A's address |
| IAT_entry_B | Function B's address |
| IAT_entry_C | Function C's address |
| ... | |
| IAT_entry_N | Function N's address |
| ... | |

FIG. 5

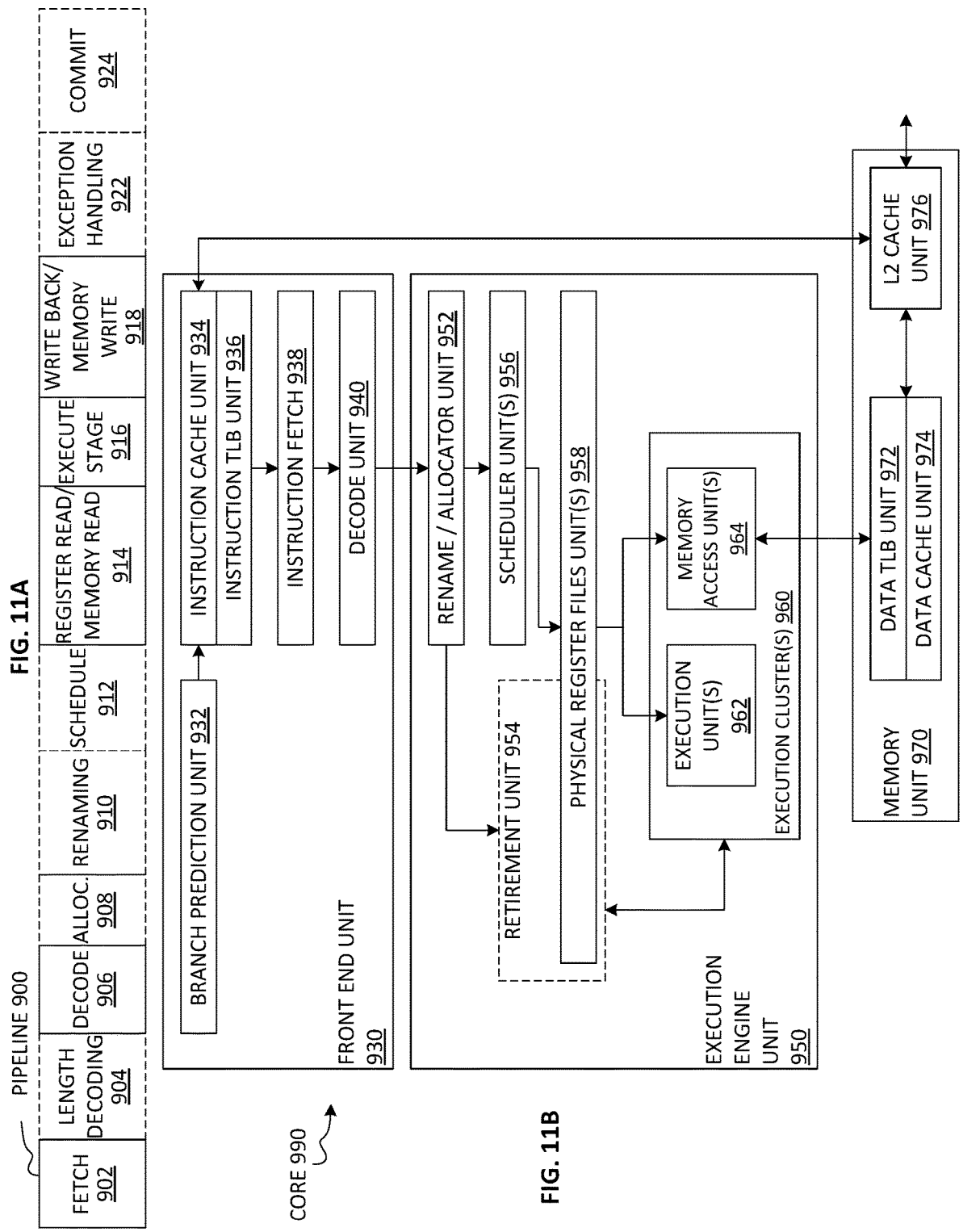

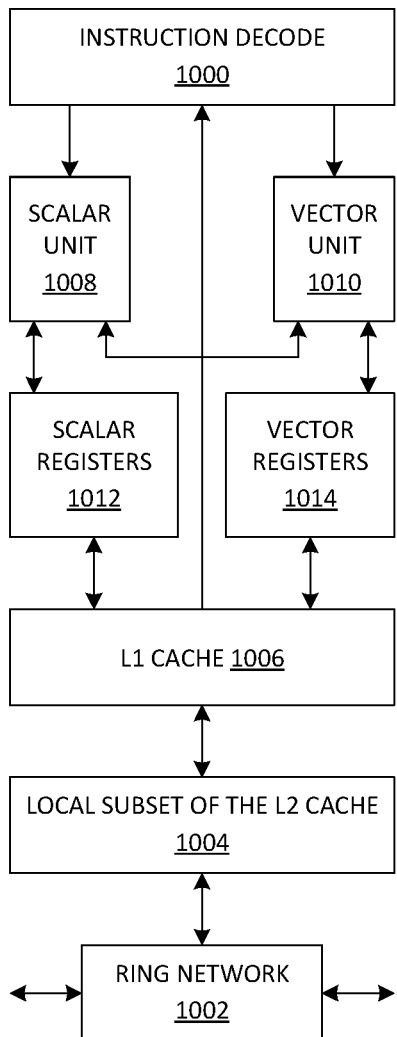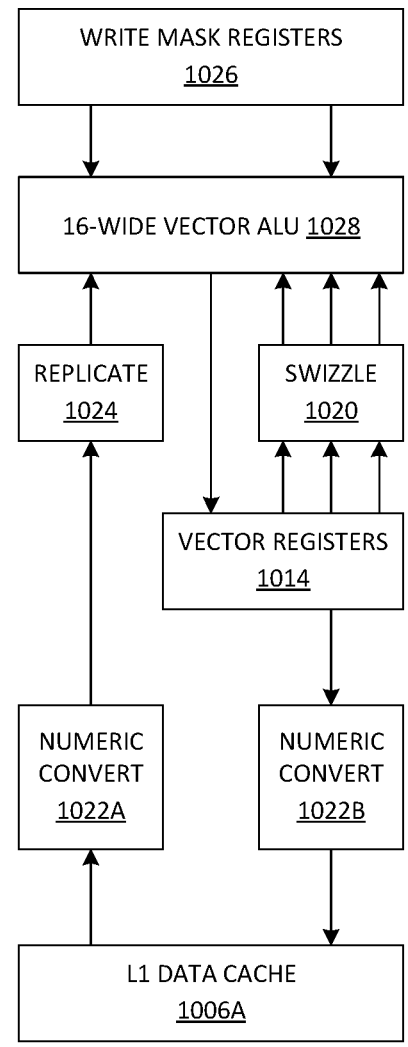
FIG. 12A
FIG. 12B

CONTEXT-BASED LOOP BRANCH PREDICTION

BACKGROUND

1. Technical Field

This disclosure generally relates to processor technology, branch prediction technology, and branch target prediction technology.

2. Background Art

Some central processor unit (CPU) cores may utilize speculative execution to avoid pipeline stalls and achieve better performance, which allows execution to continue without having to wait for the architectural resolution of a branch target or direction. Branch prediction technology utilizes a digital circuit that guesses where a branch will go before the branch instruction is executed. Correct predictions/guesses improve the flow in the instruction pipeline.

In general, there are two kind of predictions for speculative execution of branches: branch prediction for conditional branches, which may be understood as a prediction for the branch as "taken" vs. "not-taken"; and branch target prediction for unconditional or taken conditional branches, including both direct and indirect branches. Indirect branch prediction is an important part of the overall branch target prediction, because an indirect branch typically involves higher latency in its target resolution, especially for a memory indirect branch the target of which needs to be fetched from a specific memory location. A branch prediction unit (BPU) may support speculative execution by providing both branch prediction and branch target prediction to the frond-end (FE) of a CPU based on information such as the branch instruction pointer (IP), branch type, and the control flow history (also referred as branch history) prior to the prediction point.

BRIEF DESCRIPTION OF THE DRAWINGS

The various embodiments of the present invention are illustrated by way of example, and not by way of limitation, in the figures of the accompanying drawings and in which:

FIG. 4 is a flow diagram of an example of a control flow according to an embodiment;

FIG. 5 is a flow diagram of another example of a control flow according to an embodiment;

FIG. 11A is a block diagram illustrating both an exemplary in-order pipeline and an exemplary register renaming, out-of-order issue/execution pipeline according to embodiments of the invention.

FIG. 11B is a block diagram illustrating both an exemplary embodiment of an in-order architecture core and an exemplary register renaming, out-of-order issue/execution architecture core to be included in a processor according to embodiments of the invention;

FIGS. 12A-B illustrate a block diagram of a more specific exemplary in-order core architecture, which core would be one of several logic blocks (including other cores of the same type and/or different types) in a chip;

DETAILED DESCRIPTION

Figure 1:
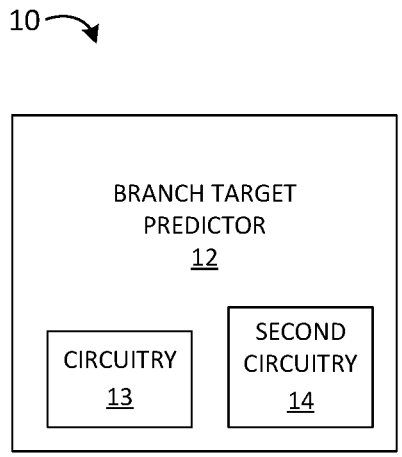
FIG. 1 is a block diagram of an example of an integrated circuit according to an embodiment.

Embodiments discussed herein variously provide techniques and mechanisms for branch prediction and/or branch target prediction. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to predict the branch target or whether a branch instruction is taken or not taken.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Context-Based Memory Indirect Branch Target Prediction Examples

Some embodiments may provide advantageous technology for context-based memory indirect branch target prediction. Conventional branch target prediction technology may be mainly based on matching the current control flow with the recorded control flow history (e.g., in terms of the recent taken branches) cached in various branch prediction arrays inside a BPU. An indirect branch does not contain its target in the instruction itself, but contains where the branch target is located. The target of an indirect branch can be designated in a specific register (a.k.a register indirect branch) or in a specific memory location (a.k.a memory indirect branch). Branch target prediction of the latter is especially important not only because it is widely used in practice, but also because memory indirect branch normally have higher latency given the branch target needs to be fetched from a memory location based on a pointer of the target (referred to herein as the "target pointer").

A conventional BPU of a processor may include several different branch target predictors that handle different branch types with different speed, accuracy and priority. They may include arrays that cache the information of the past taken branches (e.g., including indirect branches), with each entry typically including the branch IP (address of the branch instruction), branch type, branch target and sometimes a branch history vector (may also be known as the global history vector) that calculated from the information of the last-N (N as an integer) taken branches as a digital representation of the control flow history prior to the captured branch.

Conventional indirect branch target prediction is based on the cached correlation between the branch target and the control flow history and/or the branch IP of previous taken branches recorded in the BPU. However, in many cases, the control flow history (including the branch IP) may not be the best way of predicting the branch target. In case (1), indirect branches with the same control flow history/branch IP may not result in the same branch target. For example, an indirect branch that serves as a converged dispatcher calling multiple sub-routines may have the same recent control flow history leading to this same branch every time it is executed, but actually calls different function pointers with different targets. In case (2), indirect branches with different control flow histories/branch IPs may result in the same branch target when they use the same target pointer, for example, two indirect branches at different code locations calling the same function pointer, very likely going to the same target (e.g., calling the same external function through a dynamically linked call table from different locations in C code). Conventional indirect branch prediction technology may result in a mis-prediction in case (1) and failing to provide a prediction for the branch in case (2) based on other branches using the same target pointer but with different branch histories/IPs.

Different from the conventional indirect branch target prediction technology which uses the correlation between the branch target and the control flow history and/or the branch IP as the prediction criteria, some embodiments may provide context-based memory indirect branch target prediction technology, which may utilize the correlation between the branch target and the target pointer to predict the target of a memory indirect branch. Because firstly, the target pointer (e.g., a memory address holding the target) has very strong correlation with the target itself given that branch targets stored in memory (mostly in the form of function pointers) are not updated frequently in practice (e.g., in many cases the function pointers are read-only after initialization); secondly, the target pointer is always available before the fetching of the target and has no dependency on the high-latency memory access of the target fetching. Resolving only the target pointer involves much less latency than resolving the indirect branch target, which provides good performance incentive to predict the branch target at the moment when the target pointer is available. Therefore, such embodiments may advantageously be effective in predicting the targets of memory indirect branches when conventional control-flow-history-based branch target prediction fails (e.g., provides no prediction or mis-predicts). Given the aforementioned cases, which cannot be properly handled by the conventional indirect branch target prediction technology, are very common in practice and thus some embodiments of the context-based memory indirect branch prediction technology may improve processor performance by increasing both the accuracy and the coverage of the indirect branch target prediction. In some embodiments, a context-based memory indirect branch predictor may serve as a supplementary predictor and work together in parallel with conventional predictors. In some embodiments, when there is more than one prediction, the context-based predictor may have higher priority over other predictors given the strong correlation between the target pointer and the target value of memory indirect branches in practice.

With reference to FIG. 1, an embodiment of an integrated circuit 10 may comprise a branch target predictor 12 to provide branch target prediction for one or more instructions. The branch target predictor 12 includes a circuitry 13 which is configured to identify a memory indirect branch in the one or more instructions, and to provide a predicted target of the memory indirect branch based on a context of the memory indirect branch. For example, the context of the memory indirect branch may correspond to a target pointer of the memory indirect branch. Some embodiments of the branch target predictor 12 may further comprise second circuitry 14 configured to select the predicted target of the memory indirect branch between the prediction based on the context of the memory indirect branch and the prediction from one or more other indirect branch target predictors. For example, the second circuitry 14 may provide higher priority to the predicted target of the memory indirect branch based on the context of the memory indirect branch relative to the prediction from one or more other indirect branch target predictors.

In some embodiments, the circuitry 13 may be configured to maintain a data structure to correlate the target pointer information with the target information based on the context of the previously taken memory indirect branches, to determine if the target pointer of the to-be-predicted indirect branch matches any of the target pointer information stored in the data structure, and, if so determined, to provide the predicted target of the to-be-predicted memory indirect branch based on the target information in the data structure correlated with the matched target pointer information. For example, the data structure may comprise an array of entries that each includes the branch target information tagged by the corresponding target pointer information to cache the correlation between the target pointers and the branch targets. The tags, serving as the matching criteria between the context of the to-be-predicted indirect branch and the entries in the array, can be all or part of the bits of the target pointer, or a hash value calculated from all or part of the bits of the target pointer. The circuitry 13 may be further configured to calculate the tag value for the to-be-predicted memory indirect branch and determine if the calculated tag value matches the tag of a valid entry of the array, and, if so determined, to provide the predicted target of the memory indirect branch based on the target information from the corresponding entry of the array with the matching tag. For example, an entry of the array may include fields such as a tag field calculated from the target pointer information of the memory indirect branch, a target field with the target information correlated to the target pointer, a validity field to indicate the validity of the entry, and a usage field to store the usage information of the entry for replacement selection (e.g., a field of "age bits" implementing the "Least Recently Used" (LRU) algorithm). For example, when circuitry 13 finds no match in its array and fails to provide a target prediction for a memory indirect branch, a new entry will be populated in the array based on the context of this memory indirect branch after its execution and retirement, replacing an entry selected based on the usage information if no empty or invalid entry is available. The branch target in an existing entry can also be updated when circuitry 13 finds match and provides a target prediction for a memory indirect branch but is determined to be a mis-prediction after the actual target is fetched from memory. In some embodiments, the circuitry 13 may be further configured to calculate the tag value of an entry for the memory indirect branch based on both its target pointer and predetermined bits of a control register related to address translation (e.g., CR3 in Intel x86 architecture) when virtual addressing is enabled to provide isolation between different virtual address spaces.

Figure 17:
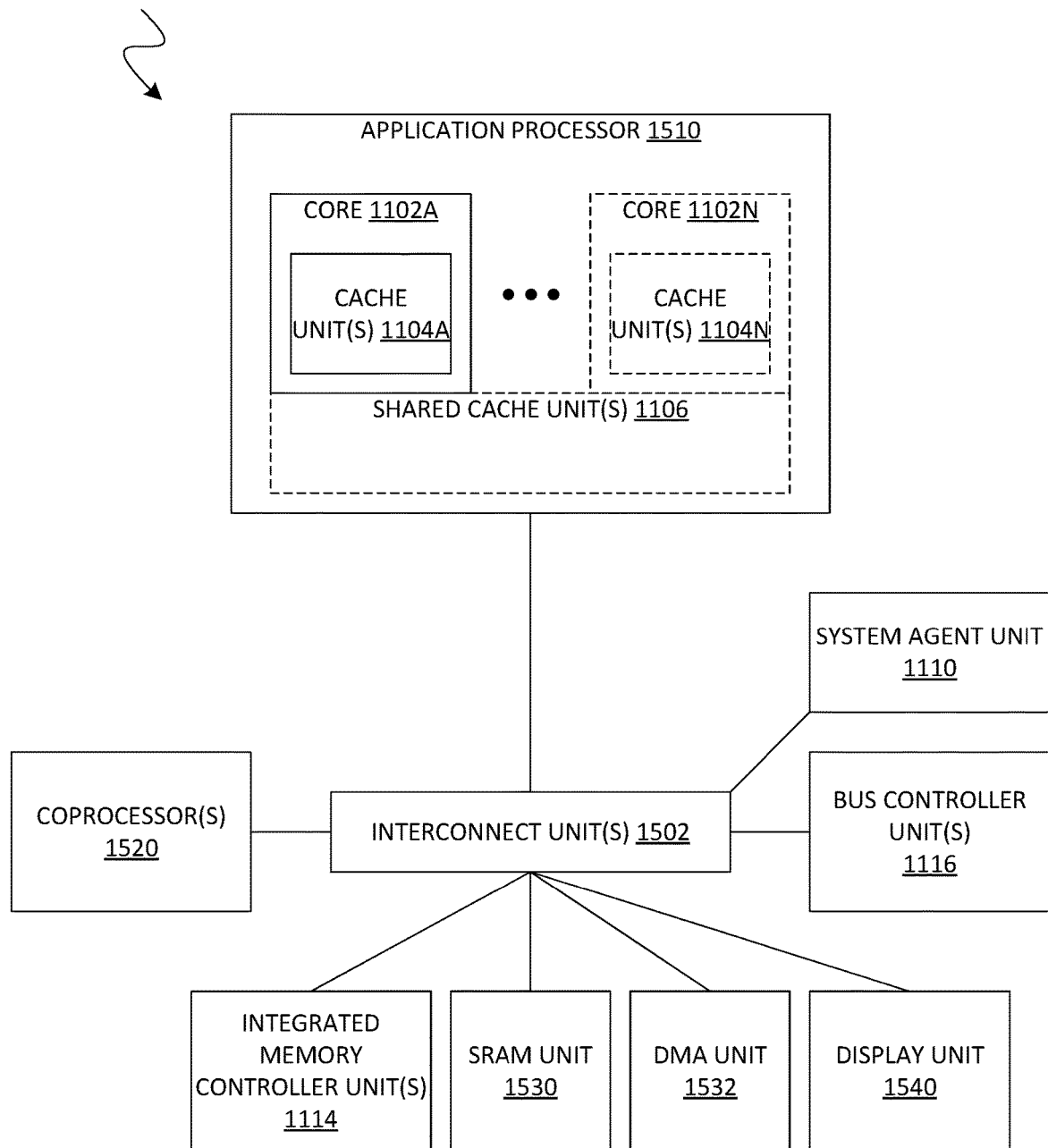
Figure 18:
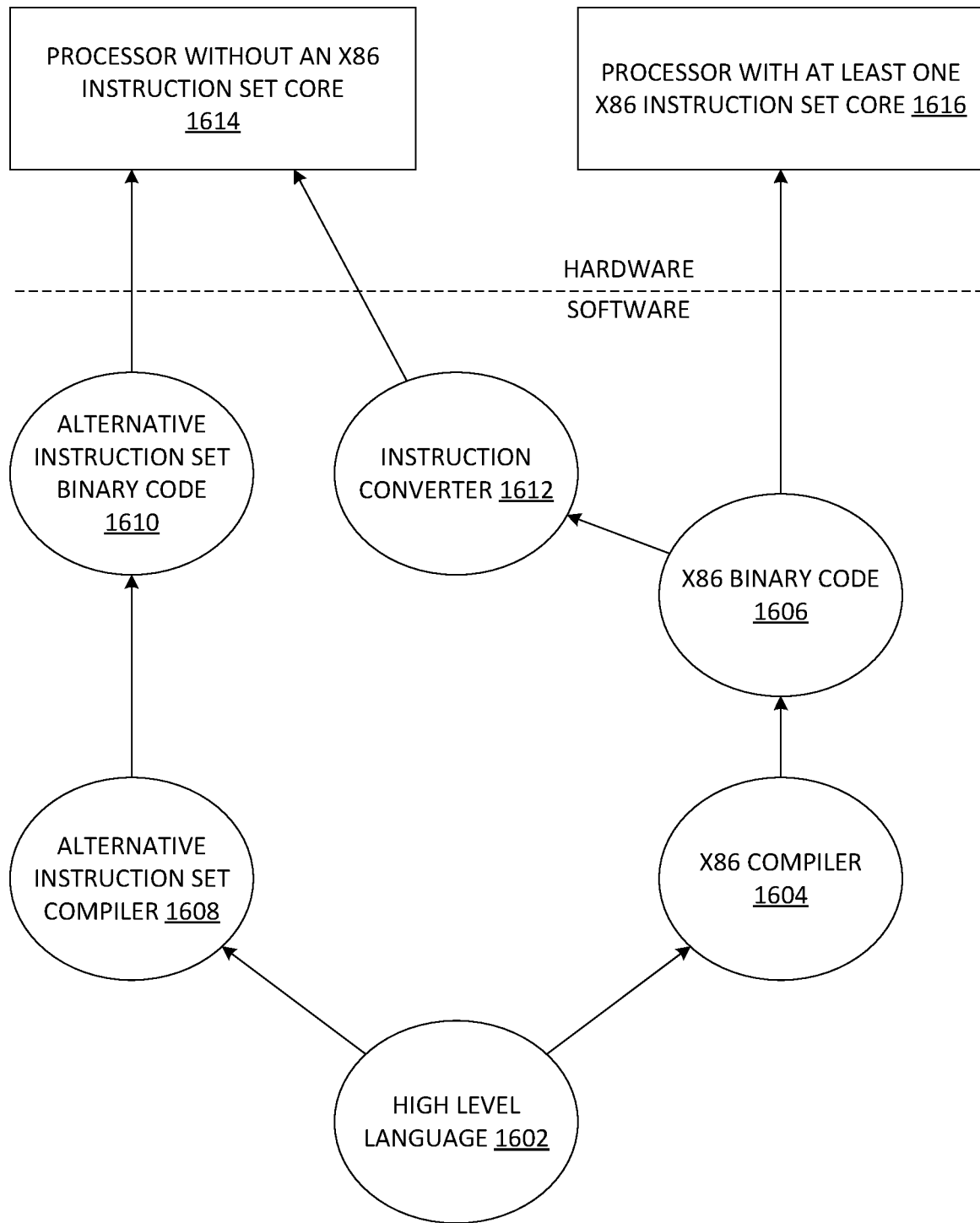
FIG. 18 is a block diagram contrasting the use of a software instruction converter to convert binary instructions in a source instruction set to binary instructions in a target instruction set according to embodiments of the invention.

Embodiments of the branch target predictor 12, the circuitry 13, and/or the second circuitry may be incorporated in a processor including, for example, the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the branch target predictor 12, the circuitry 13, and/or the second circuitry may be incorporated in the branch prediction unit 932 (FIG. 11B).

Figure 2A:
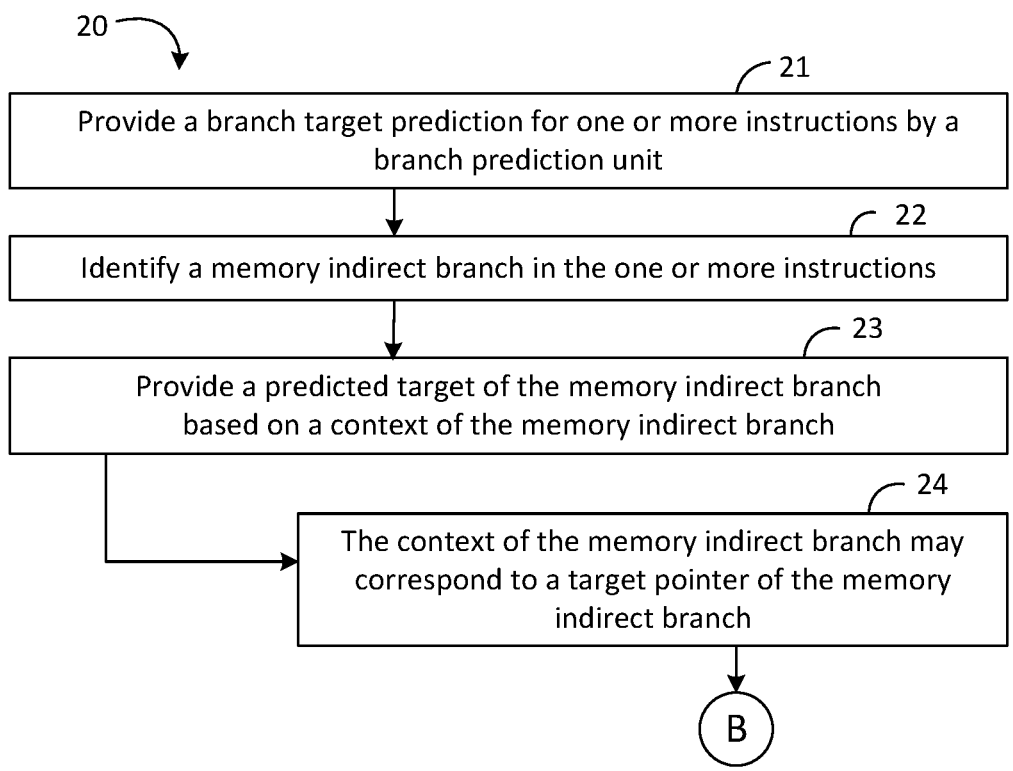
FIGS. 2A to 2C are flow diagrams of an example of a method according to an embodiment.
Figure 2B:
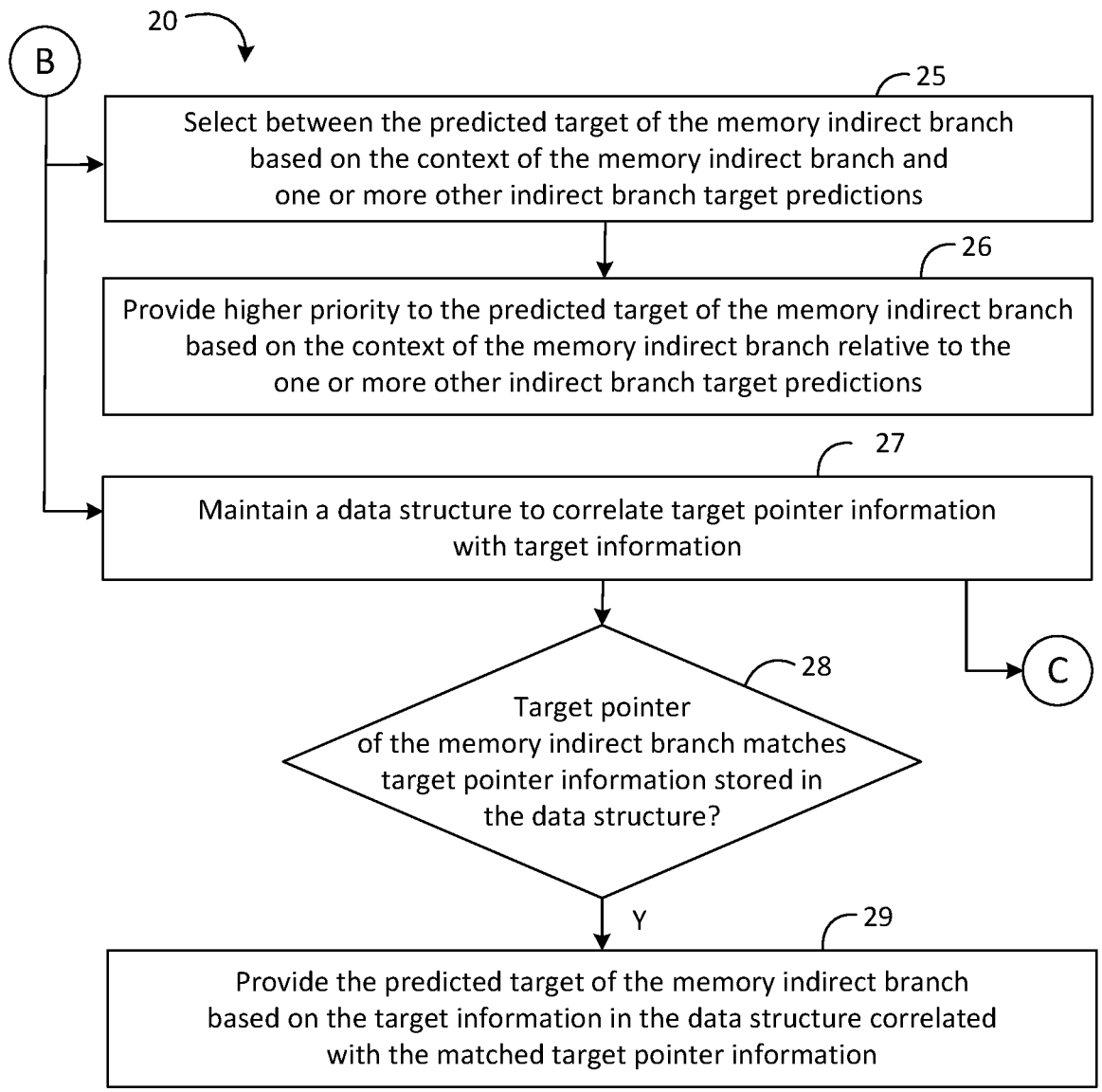
Figure 2C:
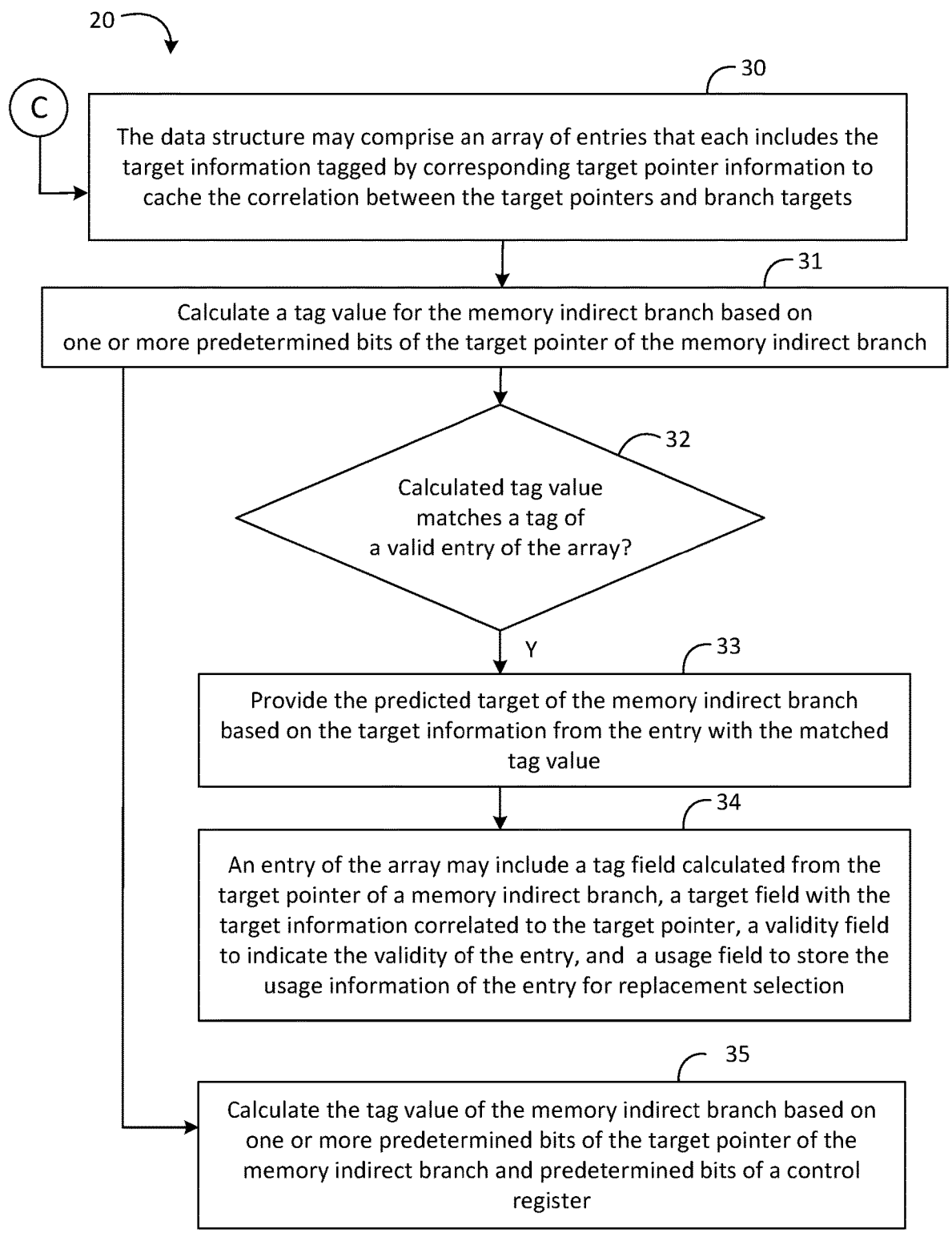

With reference to FIGS. 2A to 2C, an embodiment of a method 20 may comprise providing a branch target prediction for one or more instructions by a branch prediction unit at block 21, identifying a memory indirect branch in the one or more instructions at block 22, and providing a predicted target of the memory indirect branch based on a context of the memory indirect branch at block 23. For example, the context of the memory indirect branch may correspond to a target pointer of the memory indirect branch at block 24. Some embodiments of the method 20 may further comprise selecting between the predicted target of the memory indirect branch based on the context of the memory indirect branch and one or more other indirect branch target predictions at block 25, and providing higher priority to the predicted target of the memory indirect branch based on the context of the memory indirect branch relative to the one or more other indirect branch target predictions at block 26.

Some embodiments of the method 20 may further include maintaining a data structure to correlate target pointer information with target information at block 27, determining if the target pointer of the to-be-predicted memory indirect branch matches target pointer information stored in the data structure at block 28, and, if so determined, providing the predicted target of the memory indirect branch based on the target information in the data structure correlated with the matched target pointer information at block 29. For example, the data structure may comprise an array of entries that each includes the target information tagged by the corresponding target pointer information to cache the correlation between the target pointers and the branch targets at block 30, and the method 20 may further comprise calculating a tag value for the memory indirect branch based on one or more predetermined bits of its target pointer at block 31, determining if the calculated tag value matches the tag of a valid entry of the array at block 32, and, if so determined, providing the predicted target of the memory indirect branch based on the target information from the entry with the matched tag value at block 33. For example, an entry of the array may include a tag field calculated from the target pointer information of the memory indirect branch, a target field with the target information correlated to the target pointer, a validity field to indicate the validity of the entry, and a usage field to store the usage information of the entry for replacement selection at block 34. Some embodiments of the method 20 may further comprise calculating the tag value for the memory indirect branch based on both its target pointer and predetermined bits of a control register related to address translation when virtual addressing is enabled at block 35.

Figure 3:
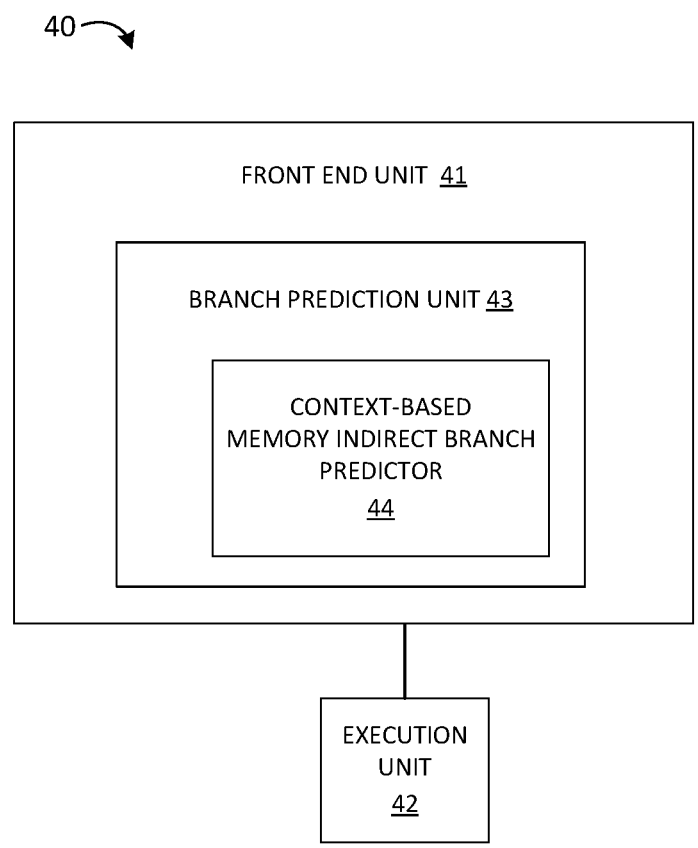
FIG. 3 is a block diagram of an example of an electronic apparatus according to an embodiment.

With reference to FIG. 3, an embodiment of an electronic apparatus 40 may comprise a front end unit 41 to fetch and decode one or more instructions, and an execution unit 42 communicatively coupled to the front end unit 41 to execute the decoded one or more instructions and provide information to the front end unit 41. The front end unit 41 may include a branch prediction unit 43 to provide branch prediction and branch target prediction information for the one or more instructions, which includes a context-based memory indirect branch predictor 44 communicatively coupled to the branch prediction unit 43, the context-based memory indirect branch predictor 44 including circuitry to identify a memory indirect branch in the one or more instructions, and provide a predicted target of the memory indirect branch based on a target pointer of the memory indirect branch. In some embodiments, the branch prediction unit 43 may further include one or more other indirect branch predictors to provide target predictions for indirect branches. The branch prediction unit 43 may be configured to select between the predicted target from the context-based memory indirect branch predictor 44 and the other predicted targets from the one or more other indirect branch target predictors. For example, the branch prediction unit 43 may be configured to provide higher priority to the predicted target from the context-based memory indirect branch predictor 44 relative to the other predicted targets from the one or more other indirect branch target predictors.

In some embodiments, the circuitry of the context-based indirect branch predictor 44 may be further configured to maintain a data structure to correlate target pointer information with the target information, determine if the target pointer of the to-be-predicted memory indirect branch matches target pointer information stored in the data structure, and, if so determined, provide the predicted target of the memory indirect branch based on the target information in the data structure correlated with the matched target pointer information. For example, the data structure may comprise an array of entries that each includes the target information tagged by the corresponding target pointer information to cache the correlation between the target pointers and the branch targets, and the circuitry of the context-based memory indirect branch predictor 44 may be further configured to calculate a tag value for the memory indirect branch based on one or more predetermined bits of its target pointer, determine if the calculated tag value matches the tag of a valid entry of the array, and, if so determined, provide the predicted target of the memory indirect branch based on the target information from the corresponding entry. For example, an entry of the array may include a tag field calculated from the target pointer information of the memory indirect branch, a target field with the target information correlated to the target pointer, a validity field to indicate the validity of the entry, and a usage field to store the usage information of the entry for replacement selection. In some embodiments, the circuitry of the context-based memory indirect branch predictor 44 may be further configured to calculate the tag value for the memory indirect branch based on both its target pointer and predetermined bits of a control register related to address translation when virtual addressing is enabled.

Embodiments of the front end unit 41, the execution unit 42, the branch prediction unit 43, and/or the context-based memory indirect branch predictor 44 may be incorporated in a processor including, for example, the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the context-based memory indirect branch predictor 44 may be incorporated in the branch prediction unit 932 (FIG. 11B).

With reference to FIG. 4, an embodiment of a control flow 48 illustrates an example case where a dispatcher routine invokes different subroutines through a call table. In this case, the memory indirect branch (the line "call QWORD PTR [rax]" as in this example) may use different target pointers and go to different branch targets in different invocations. For example, in one invocation, the indirect branch may fetch its target from $M^{th}$ entry (M is an integer) of the call table based on the target pointer and branch to subroutine M (illustrated by solid lines), while in another invocation, the indirect branch may fetch its target from $N^{th}$ entry (N is an integer different from M) of the call table based on the target pointer and branch to subroutine N (illustrated by dotted lines). Because, in different invocations of the dispatcher, the indirect branch has the same branch IP and very likely the same branch history prior to the indirect branch, conventional indirect branch predictors, which are based on the branch history and/or branch IP, will almost always mis-predict when the indirect branch goes to a different target from last invocation. Some embodiments of context-based memory indirect branch predictor can advantageously handle such cases because the target prediction is not based on branch history or branch IP, but the correlation between the target pointer and the branch target, which can effectively predict different targets across different invocations based on the target pointer at each time.

With reference to FIG. 5, an embodiment of a control flow 50 illustrates an example case where the same external function is invoked from different code locations by different memory indirect branches through an import address table (IAT). In this case, there are two indirect branches at two different lines with the instruction "call QWORD PTR [IAT_entry_N]". The first one will be referred as branch #1 and the second one will be referred as branch #2. Obviously branch #1 and branch #2 have different branch IPs and control flow histories (branch histories), while they use the same target pointer and go to the same target. Although branch #1 and branch #2 have the same target pointer and the same branch target, conventional indirect branch predictor based on branch history and/or branch IP cannot predict the target of branch #2 based on the execution of branch #1, since their branch histories and branch IPs do not match. On the other hand, some embodiments of context-based memory indirect branch predictor can advantageously handle such cases, predicting the target of branch #2 based on the correlation between the target pointer and the target created by branch #1. Cases similar to this example may have very common occurrence in practice, including most calls to dynamically linked functions (e.g., application program interfaces (APIs) functions) carried out as memory indirect branches.

Any suitable data structure may be utilized to cache an appropriate correlation between the target pointers and the branch targets. In some embodiments, a context-based memory indirect branch predictor contains an array that caches the correlation between the target pointers and the targets of memory indirect branches. The array may use all or part of the bits of the target pointer, or a hash value calculated from all or part of the bits of the target pointer, as its entry tag for prediction matching. The size of the tag field in terms of bits may vary depending on different resource and performance considerations. The array entry should also contain a target field with the cached branch target, in the form of all or part of the target bits depending on different resource and performance considerations. The array should also contain a validity field/bit to indicate the validity of the entry, and a usage field to store the usage information of the entry for replacement selection purpose. The whole array can be designed either as a fully associative array with simple tag matching, or a set-associative array to optimize the look-up/matching process. In the latter case, some bits of the target pointer can be used as the set index.

Figure 6:
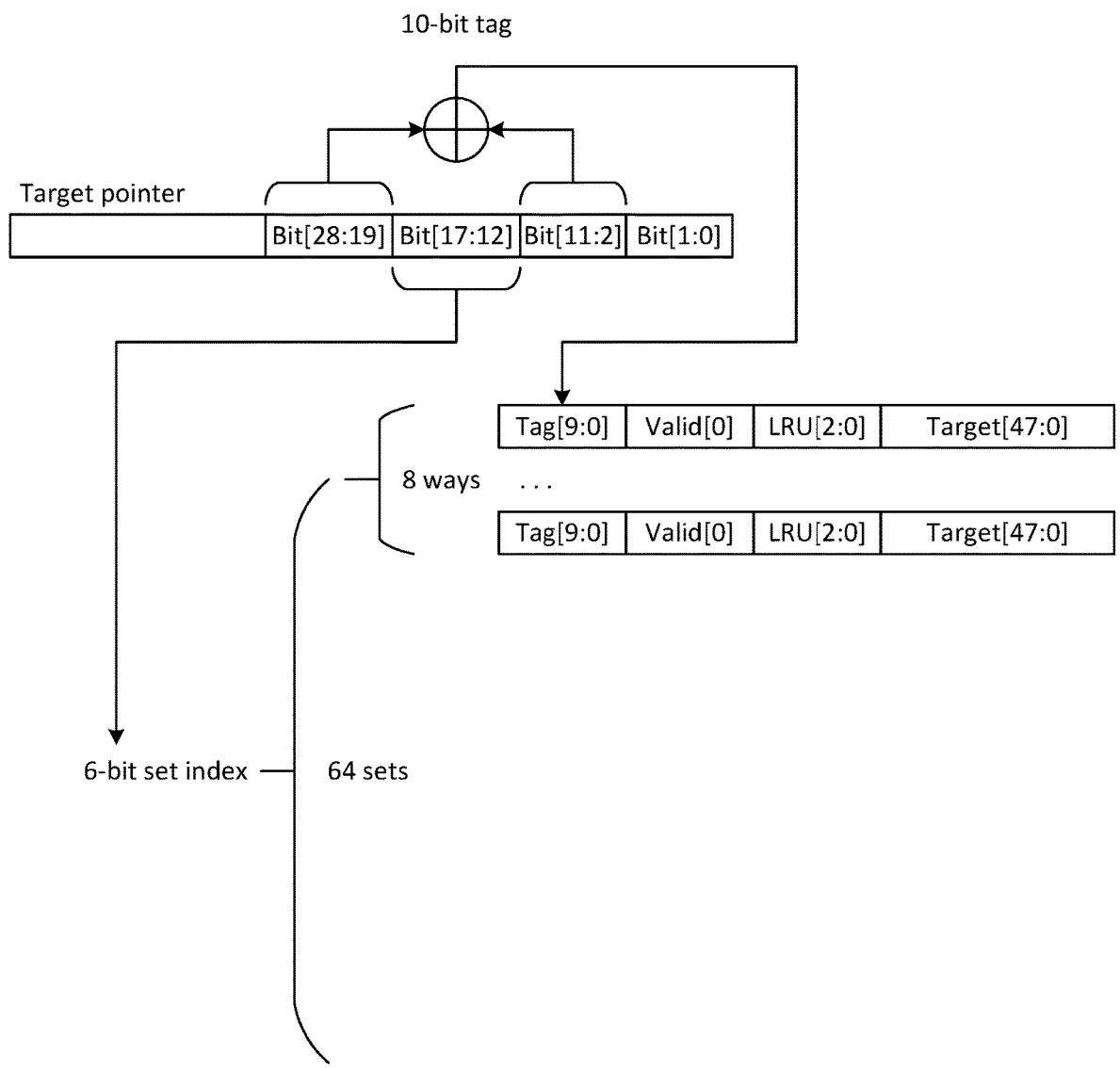
FIG. 6 is a block diagram of an example of a context-based memory indirect branch prediction array according to an embodiment.

With reference to FIG. 6, an embodiment of a context-based memory indirect branch prediction array may include a plurality of entries organized as a set-associative array. In the illustrated example, the bit range Bit[17:12] of the target pointer provides a six (6) bit set index to the array. An example context-based memory indirect branch predictor entry may contain, but is not limited to, the following fields:

Tag Field: calculated from the target pointer
Valid Bit: indicator of entry validity
LRU Field: indicator of entry usage
Target Field: cached branch target As illustrated, the example provides a 64-set by 8-way set-associative array with a total of five hundred and twelve (512) sixty-two (62) bit entries. Bit range Bit[17:12] of the target pointer is used as the set index, while the XOR (binary operation of "exclusive or") result of bit range Bit[28:19] and bit range Bit[11:2] of the target pointer is used as a 10-bit tag value. Because in most cases, function pointers should be at least 4-byte aligned in memory, the two least significant bits of the target pointer can be ignored in the prediction. In some embodiments, the tag calculation can also include certain bits from a control register related to address translation (e.g., CR3 in INTEL x86 architecture) when virtual addressing is enabled, to provide isolation between virtual address spaces, for both performance and security concerns.

Context-Based Loop Branch Prediction

Some embodiments may provide advantageous technology for context-based loop branch prediction. A loop is a basic code structure that is very commonly used in all kinds of computer programs and programming languages. At assembly code level, loops are generally implemented by conditional branch instructions. A "loop branch" herein refers to the conditional branch instruction that determines whether the loop will continue the next loop iteration or exit from the loop.

Branch prediction, different from branch target prediction, predicts the direction of a conditional branch (e.g., a conditional jump instruction) in terms of "taken" or "not taken". In most cases, the branch prediction of a loop branch (which itself is also a conditional branch) may be carried out the same way as any other conditional branches (e.g., conditional branches implementing the "if/then" statement). A BPU may utilize the general branch predictors for all conditional branches to predict loop branches.

Conventional branch predictors predict the direction of conditional branches in terms of "taken" or "not taken" mostly based on their execution histories from past invocations. Typically, a counter or state machine may be used to track the execution of a conditional branch and also generate its prediction. The counter or state machine may have multiple states between "(strongly) taken" and "(strongly) not taken", which may be updated every time the corresponding conditional branch is executed according to the resolved branch direction: the counter or state machine will be updated to an adjacent state toward "(strongly) taken", if the branch is resolved to be taken, or toward "(strongly) not taken", if the branch is resolved to be not taken, assuming the counter or state machine is not in a "saturated" state. The prediction of an unresolved conditional branch is generated from the current state of the corresponding counter or state machine tracking the branch (with certain algorithm that maps the states to the binary "taken" or "not taken" prediction), if such information is available in the predictors.

Branch predictors normally contain one or multiple arrays, each entry of which stores the branch prediction information of a corresponding conditional branch. An entry typically includes (1) a tag field used to match the entry in the array with the to-be-predicted conditional branch; (2) a prediction field that contains the predicted branch direction in terms of "taken" or "not taken" in digital representation (e.g. the aforementioned counter or state machine can be implemented in this field); and other fields which hold validity, usage information, etc.

Different types of branch predictors may use different ways to tag the entries in their arrays. One common type of branch predictor (will be hereinafter referred as Type I) may simply use all or part of the branch IP bits (or a hash calculated from all or part of the branch IP bits) as the entry tag, essentially using the address of the branch instruction as the prediction input condition. Another common type of branch predictor (will be hereinafter referred as Type II) may use the branch history vector (may also be known as the global history vector, global branch history vector) to tag the entries. Branch history vector is a digital representation of the recent control flow based on the information of the recent taken branches. It is normally implemented as a rolling hash calculated from the branch information (e.g., branch address, branch target address, etc) of the last-N (N is an integer) taken branches. Type II branch predictors may use the branch history vector only or both branch history vector and the branch IP for tagging of the array entries.

Both types of the conventional branch predictors have problems in predicting loop branches. Type I branch predictor will always mis-predict the loop branch at loop exit because the direction of the loop branch at loop exit is different from all previous loop iterations, which will induce a performance penalty that could be avoided if the loop branch is correctly predicted. Type II branch predictor, which uses or includes the branch history vector as the prediction input condition, also has difficulties in handling loop branches: (1) Type II branch predictor is history-based thus cannot properly predict the loop branch upon loop exit when the loop is executed for the first time; (2) Type II branch predictor is history-based thus cannot properly predict the loop branch upon loop exit when the final loop count (i.e., the total number of iterations the loop will perform) changes from one execution to another; (3) the branch history vector used in Type II branch predictors covers the history of last N taken branches (e.g., where N is an integer constant, typically less than one hundred), therefore Type II branch predictor cannot properly predict the loop branch upon loop exit when the final loop count is larger than N; (4) since in most cases a loop branch has different branch history vector at each loop iteration, a program loop may over populate a Type II branch predictor that uses branch history vector as entry tag (adding a new entry in each iteration), purging the older entries that are useful for predicting other branches and thus reducing the prediction efficiency.

Besides the most commonly used branch predictors for conditional branch prediction in general, there are other branch prediction technology for loop branches, includes a Loop Exit Predictor (LEP) and a Frozen History Predictor (FHP). The Loop Exit Predictor (LEP) is a count-based loop branch prediction technology. The LEP acquires a final loop count (i.e., the total number of iterations the loop will perform) for each program loop to be predicted. The final loop count is used to predict the branching behavior of the loop branch instruction. Typical methods for acquiring the final loop count include: (1) Previous loop occurrences: capturing a final loop count from a previous execution of the same loop (history-based loop count prediction); (2) Run-time loop detection: using run-time hardware analysis of the instruction stream by identifying certain instruction sequences that can reveal the location that stores the total number of iterations of the loop; and (3) Loop count location with architectural support: determining the final loop count by specifically identifying a location of a loop count value if the location of the loop count is known prior to loop execution.

The FHP provides branch predictions for loop branches based on a frozen history vector and the captured final loop count previously observed. The frozen history vector is a snapshot of a branch history vector at the time a loop is entered or detected, which preserves the prior loop branch history. Once the loop is entered, a loop iteration count may be tracked. When the loop exit is resolved, the FHP captures the correlation between the snapshotted branch history vector and the final loop iteration count at which the loop exited. The frozen history and the current iteration count at the time of prediction for a loop branch instruction are used by the FHP to compare against the captured correlation to make the prediction. A typical implementation of the FHP may have a frozen history and iteration tracker table, when it is determined that the current loop iteration count equals to the captured loop exit iteration count, the FHP predicts that the loop will be exited.

Some embodiments provide a context-based loop branch prediction technology, which may not only advantageously address the foregoing problems for the conventional branch predictors in predicting loop branches, but also have fundamental differences and advantages when compared with the existing loop branch prediction technologies. In some embodiments the context-based loop branch prediction includes two major features: (1) using dedicated conditional branch instructions for loop branches that are different from other conditional branches at assembly code/machine code level; (2) a context-based hardware loop branch predictor that can identify loop branches and provide branch prediction based on speculative loop-iteration extrapolation.

In general, a dedicated loop branch instruction shall include both the branch target and the loop exit condition. In some embodiments, such instructions may have a general form as:

LOOPBRANCHcc <branch_target>, <loop_control_variable>, <loop_exit_value> where the "LOOPBRANCHcc" is the instruction opcode in its general form, <branch_target> is the operand that specifies the branch target, <loop_control_variable> is an operand that specifies the loop-control variable that is usually updated and checked in each loop iteration as part of the loop condition, <loop_exit_value> is an operand specifying the value, normally a constant, which the <loop_control_variable> is compared with to determine if the loop will exit. The "cc" in "LOOPBRANCHcc" stands for the condition to be met between <loop_control_variable> and <loop_exit_value> in order for the loop to continue (loop branch is taken and jump to <branch_target>), similar to a conditional jump in Intel x86 instruction set (e.g., "LOOPBRANCHNE" means "continue loop if <loop_control_variable> does not equal <loop_exit_value>", "LOOPBRANCHG" means "continue loop if <loop_control_variable> is greater than <loop_exit_value>"). When the specified condition between <loop_control_variable> and <loop_exit_value> is not met, the loop will exit (loop branch is not taken and continue to the next instruction). The <loop_control_variable> can be either an explicit operand (e.g., a register or a memory location) or an implicit operand (e.g., a pre-defined register not specified in the instruction). Depending on the implementation, the <loop_control_variable> can either be incremented or decremented by the loop branch instruction itself upon execution, or left to be updated by other instructions. The <loop_exit_value> can also be an explicit operand (e.g., a register, a memory location or an immediate operand as a constant value), an implicit operand (e.g., a pre-defined register not specified in the instruction) or absent in which case the <loop_control_variable> will be compared with 0.

An existing example is the "LOOP" instruction in Intel x86 instruction set. "LOOP" instruction has an explicit operand specifying its branch target (as a relative offset) and also an implicit operand specifying the loop-control variable, in this case a "loop counter" in ECX register (in 32-bit mode). Each time the "LOOP" instruction is executed, the value in ECX register is decremented first and then compared with 0: if not equal, then the loop continues (the "LOOP" branch is taken and jumps to its branch target), otherwise, the loop exits (the "LOOP" branch is not taken and continues to next instruction).

The "LOOP" instruction can be viewed as a specific implementation of the "LOOPBRANCHcc" instruction aforementioned, which is equivalent to:

LOOPBRANCHNE <branch_target>, ECX, 0

Here "LOOPBRANCHNE" means "continue loop if ECX does not equal 0", in this case the "LOOPBRANCHNE" instruction also decrements the <loop_control_variable> (in ECX) in each execution before the loop condition check.

Using dedicated loop branch instructions for loops in computer program can be implemented with compiler support (e.g., a compiler plugin). The dedicated loop branch instructions can be either an existing one like the "LOOP" instruction in Intel x86 instruction set, or newly added instructions, as an instruction set extension, with the general form as the "LOOPBRANCHcc" instructions aforementioned. The compiler support ensures that when a program is compiled, any loop that is compile-able using dedicated loop branch instructions shall be compiled with such instructions. In relatively rare cases, it is allowed to compile loops using general conditional branches if the loops have complex loop exit conditions that cannot be compiled with the loop branch instructions. In such cases, the general conditional branches implementing the loops will be predicted as any other general conditional branches, which does not affect the effectiveness and the performance benefit of the contexed-based loop branch prediction.

As an example, a "for loop" in C code with 100 iterations may have the format as below:

```
...
for (int i = 0; i < 100; i++) {
//loop content
...
}
...
```

In most cases, current compilers use general conditional branches to implement a loop at assembly language/machine code level. Using Intel x86 instruction set as an example, the "for loop" above may be compiled as:

```
...
MOV DWORD PTR [i_addr], 0
JMP loop_control
loop_start:
;loop content
...
INC DWORD PTR [i_addr]
loop_control:
CMP DWORD PTR [i_addr], 0x64
JL loop_start
...
```

Here the i_addr is the memory address of the loop-control variable i. In the case of context-based loop branch prediction, this "for loop" may be compiled with dedicated loop branch instructions with compiler support. For example, when using the existing "LOOP" instruction in Intel x86 instruction set, the "for loop" above may be compiled as:

```
...
MOV ECX, 0x65
JMP loop_control
loop_start:
;loop content (which does not clobber ECX)
...
loop_control:
LOOP loop_start
...
```

In this case the "LOOP" instruction, by its definition, has the loop-control variable (loop counter) in ECX register, which will be decremented by 1 every time the "LOOP" instruction executes and then compared with 0: if equals 0, the "LOOP" instruction will exit loop and continue to the next instruction. This "for loop" may also be compiled with loop branch instructions with a more general form as the "LOOPBRANCHcc" instructions described earlier:

```
...
MOV DWORD PTR [i_addr], 0
JMP loop_control
loop_start:
;loop content
...
INC DWORD PTR [i_addr]
loop_control:
LOOPBRANCHL loop_start, DWORD PTR [i_addr], 0x64
...
```

Here the "LOOPBRANCHL" instruction, as described earlier, is a conditional branch instruction that is dedicated to implement loops, which has three operands: "loop_start" as the branch target, "DWORD PTR [i_addr]" as the loop-control variable, "0x64" (100 in decimal form) as the loop exit value. "LOOPBRANCHL" means "continue the loop if the loop control variable (DWORD PTR [i_addr]) is less than the loop exit value (0x64)", in which case it jumps to "loop_start" (next loop iteration), otherwise the loop exits. In this example, the "LOOPBRANCHL" instruction itself does not increment or decrement the loop control variable like the existing "LOOP" instruction, instead leaving it for other instructions to update.

In some embodiments, context-based loop branch prediction may include a hardware loop branch predictor that can identify the loop branches and generate prediction by speculative loop-iteration extrapolation. Basically, it takes advantage of the fact that in most cases a program loop is controlled by a loop-control variable which is updated (incremented or decremented) with a fixed stride in each loop iteration and compared with a certain value to determine if the loop exits. The context-based loop branch predictor can speculatively calculate the loop-control variable for next loop iteration, check if the loop will exit at next iteration and generate the corresponding branch prediction for the loop branch. The speculative calculation of loop-control variable for next iteration can be carried out by simple extrapolation based on the values of the loop-control variable at the current and the previous iteration, assuming it will be updated with a fixed stride:

$$(\text{loop-central variable})I_{next\ iteration} =$$
$$(\text{loop-control variable})I_{current\ iteration} + \text{stride}$$

Considering that stride =

$$(\text{loop-control variable})I_{current\ iteration} - (\text{loop-control variable})$$
$$I_{previous\_iteration} \text{ then (loop-control variable)}I_{next\ iteration} =$$
$$(\text{loop-control variable})I_{current\ iteration} + [(\text{loop-control variable})$$
$$I_{current\ iteration} - (\text{loop-control variable})I_{previous\_iteration}]$$

which is the same as (loop-control variable)$I_{next\ iteration}$ =

$$2 \times (\text{loop-control variable})I_{current\ iteration} -$$
$$(\text{loop-control variable})I_{previous\_iteration}$$

The context-based loop branch predictor just needs to save the loop-control variable value from previous loop iteration. Then it can calculate the speculative loop-control variable value for next iteration and predict if the loop branch will exit loop at next iteration by checking the loop exit condition using the speculative loop-control variable value calculated for next iteration. This can be simply carried out with the implementation of the dedicated loop branch instructions aforementioned:

LOOPBRANCHcc <branch_target>, <loop_control_variable>, <loop_exit_value> which allows the context-based loop branch predictor to easily identify a loop branch by its instruction opcode and also provides clear information regarding the loop-control variable and the loop exit condition (including the loop exit value).

A typical context-based loop branch predictor can be a hardware predictor with an array of multiple entries that each corresponds to a loop branch instruction. An entry may contain, but not be limited to, the following fields: (1) a tag field used to identify the loop branches, which may be calculated based on the branch IPs; (2) a "previous loop-control variable" field to store the loop-control variable value from previous loop iteration (last execution); (3) a prediction field that has the predicted branch direction in terms of "taken" or "not taken" in digital form; (4) a validity field to indicate if the entry is tracking an active loop branch (active meaning the loop has started and has not exited yet); (5) a usage field to store the usage information for entry replacement selection.

A typical work flow of the context-based loop branch predictor has the following steps:

1. Identify a loop branch that is in its prediction scope, which can be easily carried out at instruction decoding stage with the implementation of dedicated loop branch instructions.

2. Calculate a tag for the to-be-predicted loop branch and look for matching entry in the prediction array with the same tag as the to-be-predicted loop branch, populate a new entry if no existing matching entry, using an empty or invalid entry if available or overwriting an existing entry selected by certain replacement algorithm based on the usage information stored in the usage fields.

3. Provide the prediction result, in terms of "taken" or "not taken", from the prediction field of the corresponding entry, which was generated at the previous execution (previous loop iteration) of the loop branch. The prediction is defaulted to "taken" (continuing the loop) when the loop branch is executed the first time (first loop iteration) in an active loop.

4. Calculate the speculative value of the loop-control variable for next loop iteration by extrapolation based on the values of the current loop-control variable and the saved previous loop-control variable.

5. Generate the prediction result for next execution (next loop iteration) of the loop branch by checking the loop exit condition using the speculative value of loop-control variable for next iteration (calculated in Step 4), and update the prediction field of the corresponding entry accordingly. The loop exit condition and the loop exit value can be simply obtained from the opcode and operand of the dedicated loop branch instruction. The context-based loop branch predictor may either implement this checking as an internal hardware logic or by using the generic execution unit.

6. Update the validity field of the entry to be "invalid" when the corresponding loop branch is resolved to be "not taken" (loop has exited), indicating the loop is not active anymore and the entry is not valid and can be overwritten.

The context-based loop branch predictor can advantageously handle the branch prediction for loop branches comparing with the conventional conditional branch predictors. As mentioned above, Type I branch predictors, which identify and tag the branches based on their branch IPs, will always mis-predict loop branches at loop exit, while Type II branch predictors, which identify and tag the branches based on their branch history vectors, will mis-predict loop branches at loop exit in many cases due to various limitations. As a comparison, the context-based loop branch predictor can properly predict the loop exit (as well as other loop iterations) by speculative loop-iteration extrapolation. Moreover, since prediction of loop branches can be handled by the context-based loop branch predictor, conventional branch predictors no longer need to predict loop branches as general conditional branches (which is very easy to implement with the dedicated loop branch instructions aforementioned), thus avoiding the issue that loop branches may over-populate a Type II predictor by adding a new branch entry in its array at every loop iteration. Therefore context-based loop branch prediction can not only improve the prediction accuracy for loop branches, but also increase the efficiency of conventional branch predictors in predicting general conditional branches.

Embodiments of context-based loop branch prediction also have fundamental differences and various advantages comparing with other loop prediction technologies such as aforementioned LEP and FHP. Both the LEP and the FHP are count-based loop branch prediction: the prediction of a loop branch is based on the predicted final loop count, which is determined or captured by the predictor before the prediction of the loop branch. The predicted final loop count either comes from the execution history (previous instances)

of the same loop (e.g. for the FHP and certain implementation of the LEP), or is obtained from complicated run-time hardware analysis of the instruction stream or architectural support (e.g., other implementations of the LEP). In contrast with the FHP and LEP, the context-based loop branch prediction does not involve either the final loop count or the execution history of the loop from previous instances, instead it is based on speculative loop-iteration extrapolation: at every prediction, the predictor consumes the prediction from previous loop iteration and also generates prediction for the next loop iteration.

Embodiments of the context-based loop branch prediction have several advantages comparing with the existing loop prediction technologies such as the FHP and LEP. Firstly, since the context-based loop branch prediction does not depend on the execution history of the loop from previous instances (as the FHP and certain implementation of the LEP), it can better handle the prediction of a loop for its first execution. Secondly, since the context-based loop branch prediction is not based on the predicted final loop count, it can better handle the cases when the final loop count changes between different execution instances of the same loop or gets updated during the execution of a loop.

Embodiments of the context-based loop branch prediction also have another advantage over both the conventional branch predictors and other existing loop predictors (e.g., the FHP and the LEP) for its required footprint size regarding the prediction arrays. In order to make a proper prediction, all other predictors aforementioned need to have the corresponding entry present in their prediction arrays before the to-be-predicted loop starts executing. Therefore, in general these predictors need to have large array size to keep as many entries as practically possible (usually in order of hundreds) to increase the prediction efficiency and coverage. On the other hand, the context-based loop branch predictor uses loop-iteration extrapolation, which only needs to keep an entry valid while the corresponding loop is active (the entry is marked invalid once the loop exits), in which case the number of entries only needs to be enough to cover (in most cases) the number of loops that are active at the same time (e.g. nested loops or loops from different execution contexts). Depending on the implementation requirement, an 8-entry or 16-entry array in the context-based loop branch predictor shall be adequate for most cases in practice.

Figure 7:
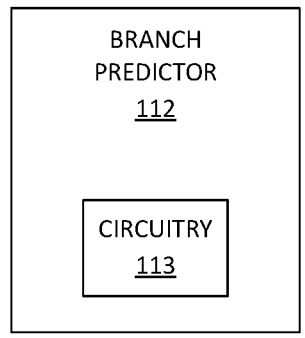
FIG. 7 is a block diagram of another example of an integrated circuit according to an embodiment.

With reference to FIG. 7, an embodiment of an integrated circuit 110 may comprise a branch predictor 112 to predict whether a conditional branch is taken or not taken for one or more instructions, the branch predictor 112 including circuitry 113 to identify a loop branch instruction in the one or more instructions, and provide a branch prediction for the loop branch instruction based on a context of the loop branch instruction. For example, the context of the loop branch instruction may correspond to operand values of the loop branch instruction from a current iteration of the loop branch instruction and a previous iteration of the loop branch instruction.

In some embodiments, the circuitry 113 may be configured to speculatively calculate a loop-control variable for a next iteration of the loop branch instruction, and provide the branch prediction based on whether the calculated loop-control variable indicates that the loop branch instruction will exit loop at the next iteration of the loop branch instruction. For example, the circuitry 113 may be further configured to extrapolate the loop-control variable for the next iteration of the loop branch instruction based on respective loop-control variables from the current iteration of the loop branch instruction and the previous iteration of the loop branch instruction.

In some embodiments, the circuitry 113 may be configured to save the loop-control variable value from previous iteration of the loop branch instruction. For example, the circuitry 113 may be configured to store an array of entries that each corresponds to a respective loop branch instruction. In some embodiments, an entry of the array may include a tag field calculated by circuitry 113 to identify the loop branches, a field to store the previous value of a loop-control variable, a prediction field with the predicted branch direction in terms of "taken" or "not taken", a validity field to indicate the validity of the entry, and a usage field to store the usage information for entry replacement selection.

Embodiments of the branch target predictor 112 and/or the circuitry 113 may be incorporated in a processor including, for example, the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the branch target predictor 112 and/or the circuitry 113 may be incorporated in the branch prediction unit 932 (FIG. 11B).

Figure 8A:
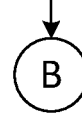
FIGS. 8A to 8C are flow diagrams of another example of a method according to an embodiment.
Figure 8B:
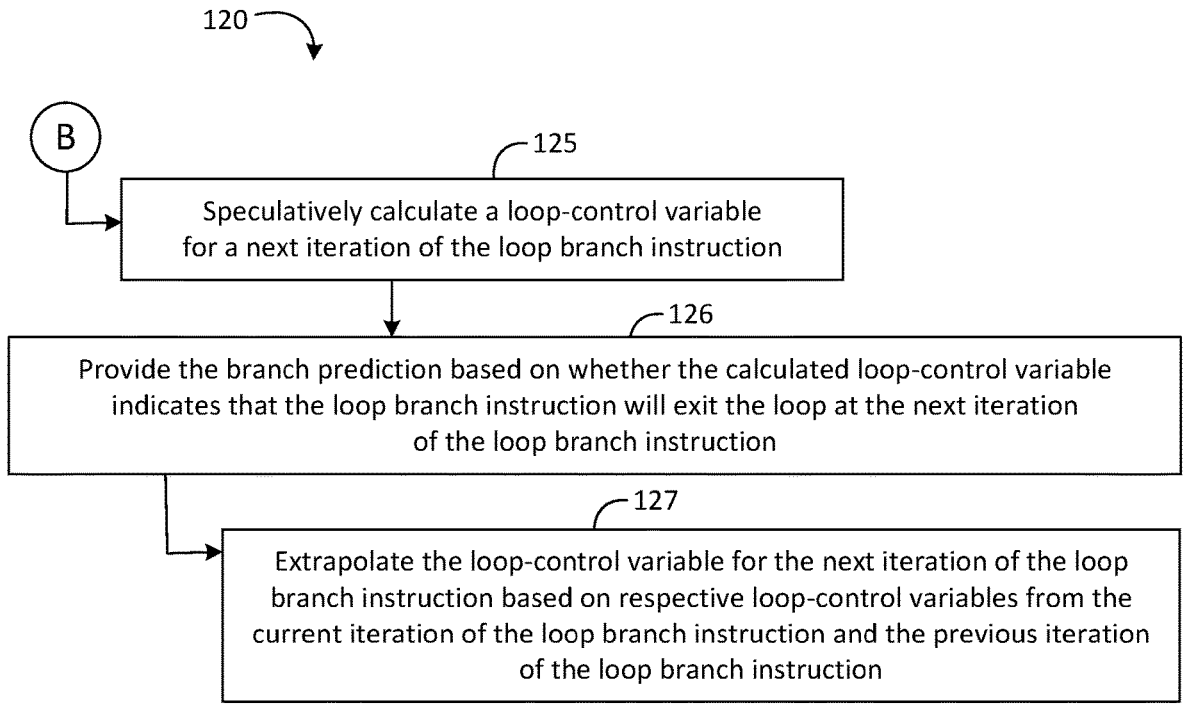
Figure 8C:
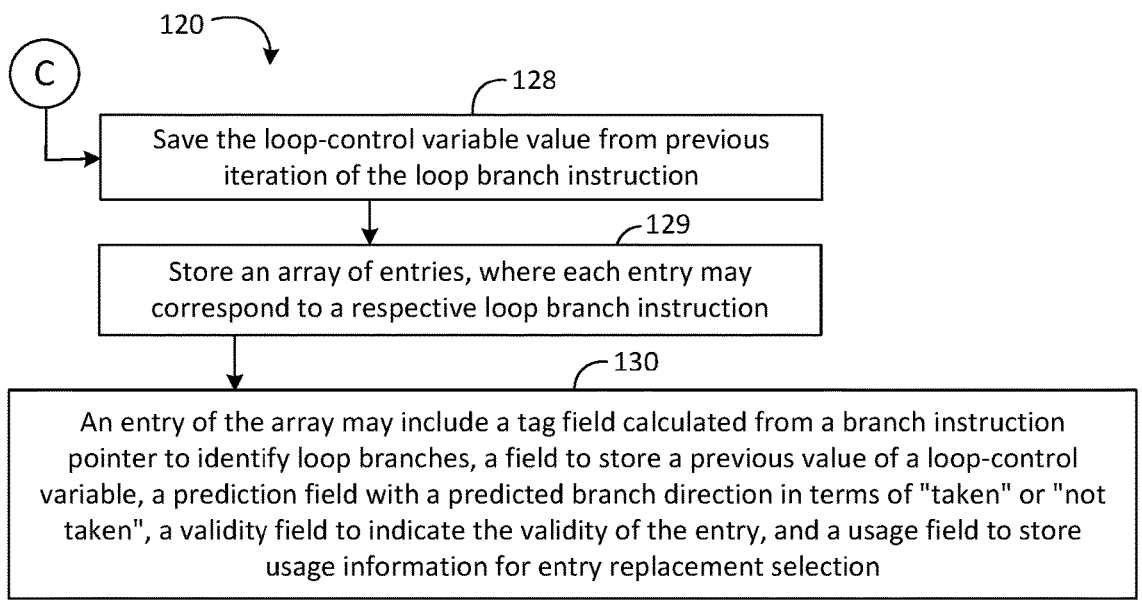

With reference to FIGS. 8A to 8C, and embodiment of a method 120 may include processing one or more instructions by a branch prediction unit at block 121, identifying a loop branch instruction in the one or more instructions at block 122, and providing a branch prediction for the loop branch instruction based on a context of the loop branch instruction at block 123. For example, the context of the loop branch instruction may correspond to operand values of the loop branch instruction from a current iteration of the loop branch instruction and a previous iteration of the loop branch instruction at block 124. Some embodiments of the method 120 may further include speculatively calculating a loop-control variable for a next iteration of the loop branch instruction at block 125, and providing the branch prediction based on whether the calculated loop-control variable indicates that the loop branch instruction will exit loop at the next iteration of the loop branch instruction at block 126. For example, the method 120 may include extrapolating the loop-control variable for the next iteration of the loop branch instruction based on respective loop-control variables from the current iteration of the loop branch instruction and the previous iteration of the loop branch instruction at block 127.

Some embodiments of the method 120 may further include saving the loop-control variable value from previous iteration of the loop branch instruction at block 128. For example, the method 120 may include storing an array of entries that each corresponds to a respective loop branch instruction at block 129, where an entry of the array may include a tag field calculated from the branch IP to identify the loop branches, a field to store the previous value of a loop-control variable, a prediction field with the predicted branch direction in terms of "taken" or "not taken", a validity field to indicate the validity of the entry, and a usage field to store the usage information for entry replacement selection at block 130.

Figure 9:
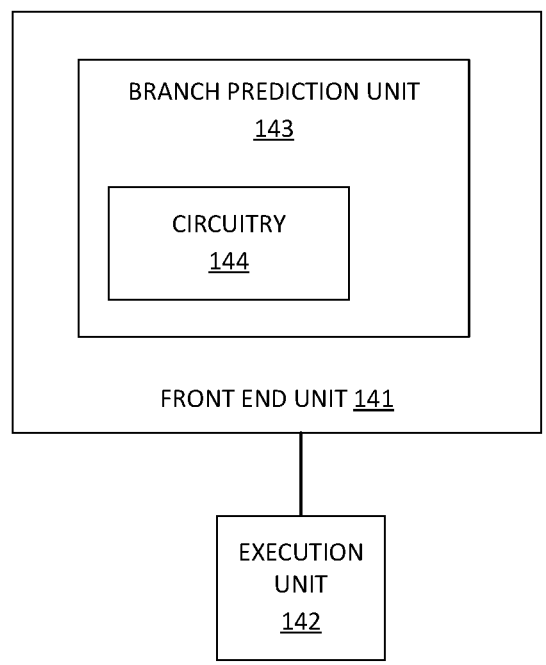
FIG. 9 is a block diagram of another example of an electronic apparatus according to an embodiment.

With reference to FIG. 9, an embodiment of an electronic apparatus 140 may comprise a front end unit 141 to fetch and decode one or more instructions, and an execution unit 142 communicatively coupled to the front end unit 141 to execute the one or more instructions and provide information to the front end unit 141. The front end unit 141 may include a branch prediction unit 143 which can predict whether a conditional branch is taken or not taken for the one or more instructions. The branch prediction unit 143 may include circuitry 144 to identify a loop branch instruction in the one or more instructions, and provide a branch prediction for the loop branch instruction based on a context of the loop branch instruction. For example, the context of the loop branch instruction may correspond to operand values of the loop branch instruction from a current iteration of the loop branch instruction and a previous iteration of the loop branch instruction.

In some embodiments, the circuitry 144 may be configured to speculatively calculate a loop-control variable for a next iteration of the loop branch instruction, and provide the branch prediction based on whether the calculated loop-control variable indicates that the loop branch instruction will exit loop at the next iteration of the loop branch instruction. For example, the circuitry 144 may be configured to extrapolate the loop-control variable for the next iteration of the loop branch instruction based on respective loop-control variables from the current iteration of the loop branch instruction and the previous iteration of the loop branch instruction.

In some embodiments, the circuitry 144 may be configured to store the loop-control variable values from the previous iteration of loop branch instructions in an array of entries that each corresponds to a respective loop branch instruction. For example, an entry of the array includes a tag field calculated by circuitry 144 from the branch IP to identify the loop branches, a field to store the previous value of a loop-control variable, a prediction field with the predicted branch direction in terms of "taken" or "not taken", a validity field to indicate the validity of the entry, and a usage field to store the usage information for entry replacement selection.

Embodiments of the front end unit 141, the execution unit 142, the branch prediction unit 143, and/or the circuitry 144 may be incorporated in a processor including, for example, the core 990 (FIG. 11B), the cores 1102A-N (FIGS. 13, 17), the processor 1210 (FIG. 14), the co-processor 1245 (FIG. 14), the processor 1370 (FIGS. 15-16), the processor/coprocessor 1380 (FIGS. 15-16), the coprocessor 1338 (FIGS. 15-16), the coprocessor 1520 (FIG. 17), and/or the processors 1614, 1616 (FIG. 18). In particular, embodiments of the circuitry 144 may be incorporated in the branch prediction unit 932 (FIG. 11B).

Figure 10:
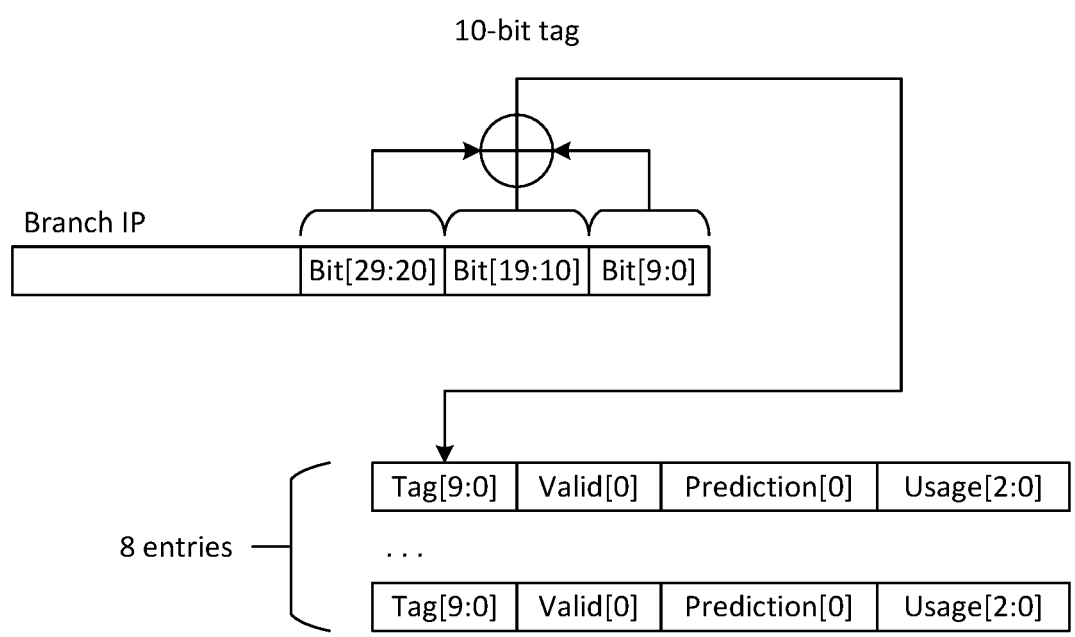
FIG. 10 is a block diagram of an example of a loop branch prediction array according to an embodiment.

With reference to FIG. 10, an embodiment of a prediction array of a context-based loop branch predictor may include eight (8) entries. In this exemplary embodiment the "LOOP" instruction in an x86 instruction set is used as the dedicated loop branch instruction. An example of an entry of the loop branch prediction array may include the following fields:

Tag Field: a field calculated from the branch IPs to identify the loop branches for branch prediction, in this example it is a 10-bit hash calculated from the lower 30 bits of the branch IP by XOR (binary operation of "exclusive or") the bit ranges Bit[29:20], Bit[19:10] and Bit[9:0];

Prediction Field: the predicted branch direction in terms of "taken" or "not taken" in digital representation;

Valid Bit: indication of the validity of the entry;

Usage Field: a field to store the usage information for entry replacement selection, in this example it is a 3-bit field implementing the "Least Recently Used" (LRU) algorithm.

In this example the field to store the previous loop-control variable is absent because the loop-control variable (stored in ECX in 32-bit mode) is decremented by the LOOP instruction itself with a fixed and known stride 1. Therefore, there is no need to save the previous loop-control variable value to determine the stride in this case.

Every time a "LOOP" instruction is fetched, its branch IP is used to calculate a tag and look for the matching entry in the prediction array by comparing the calculated tag with the tags of the array entries. If there is a match, the prediction result from the corresponding entry is used as the branch prediction for the to-be-predicted "LOOP" branch. Otherwise a new entry will be populated using an empty or invalid entry or replacing a least used entry if no empty or invalid entry is available. The speculative value of the loop-control variable for next iteration can be simply calculated as extrapolation by one more stride from the current loop-control variable, basically another decrement by 1 from the value in ECX (in 32-bit mode) after the build-in decrement by "LOOP" instruction. When the predicted loop-control variable (post decrement) for next iteration is 0, the "LOOP" branch will be predicted to be "not taken" (exiting loop), otherwise predicted to be "taken" (continuing loop). The new prediction result will be updated into the prediction field of the corresponding entry, and consumed for loop branch prediction at next iteration. Whenever the "LOOP" branch is resolved to be "not taken" (exiting loop), the valid bit of the corresponding entry will be cleared to indicate the loop is not active anymore and the entry is available to be overwritten.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 11B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 13:
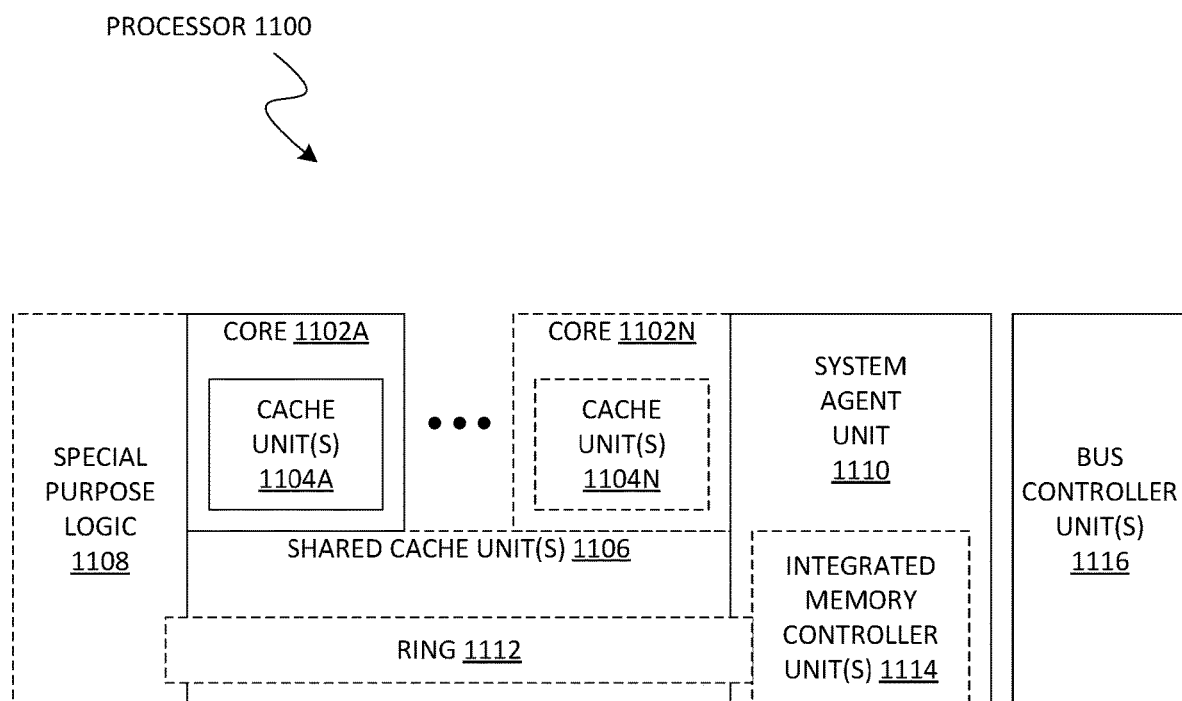
FIG. 13 is a block diagram of a processor that may have more than one core, may have an integrated memory controller, and may have integrated graphics according to embodiments of the invention.

FIG. 13 is a block diagram of a processor 1100 that may have more than one core, may have an integrated memory controller, and may have integrated graphics according to embodiments of the invention. The solid lined boxes in FIG. 13 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
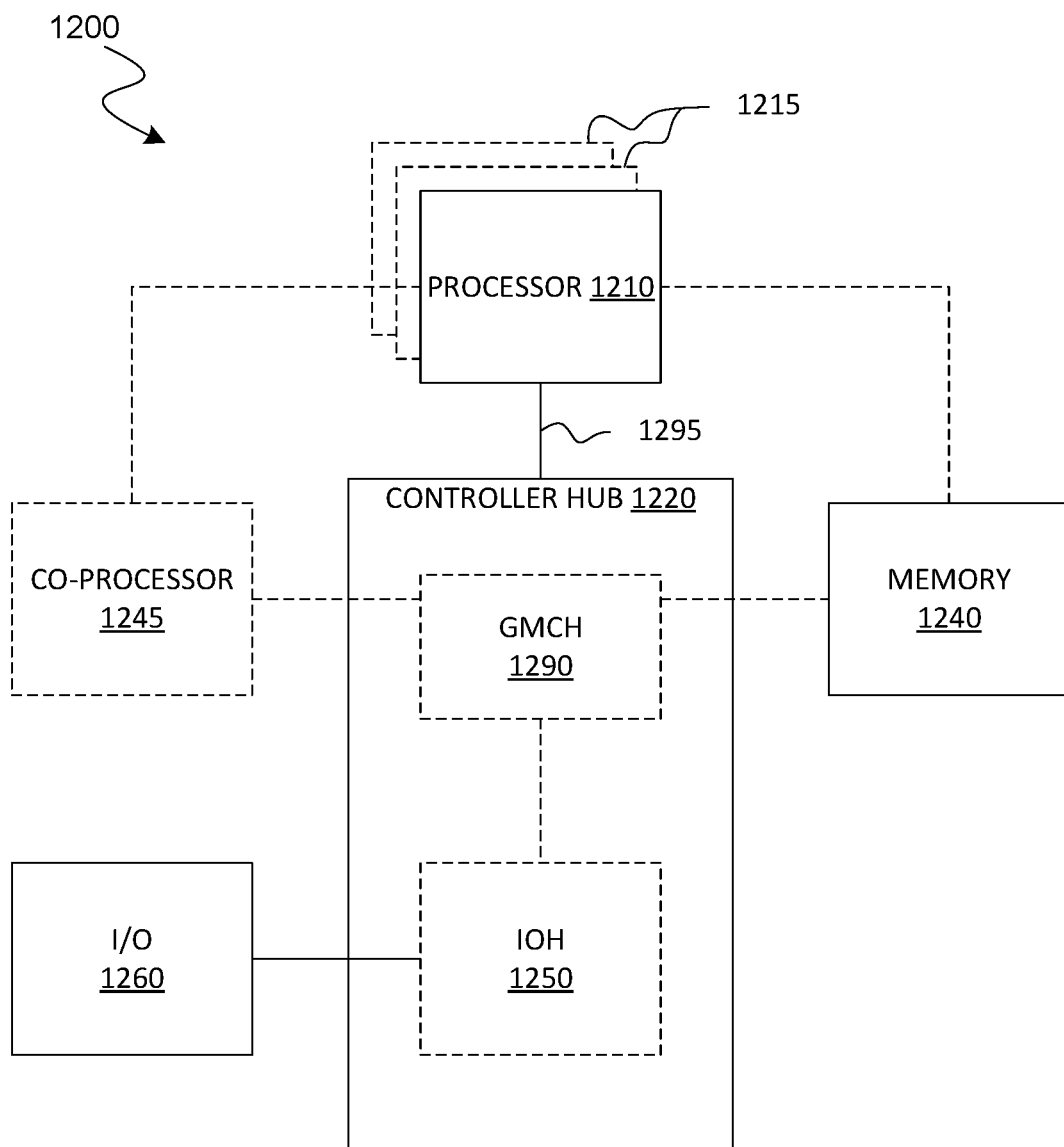
FIGS. 14-17 are block diagrams of exemplary computer architectures.

Referring now to FIG. 14, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 14 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 15:
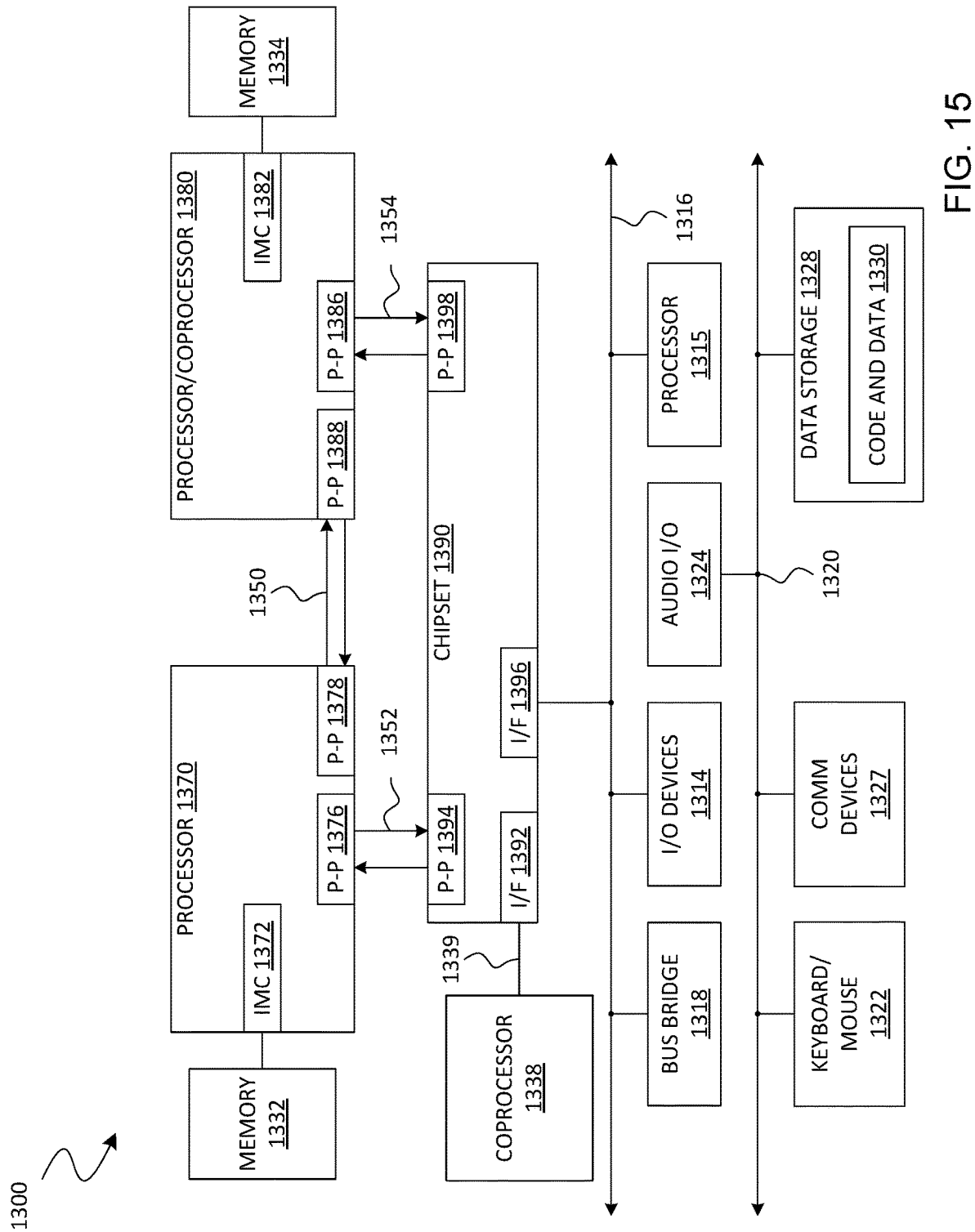

Referring now to FIG. 15, shown is a block diagram of a first more specific exemplary system 1300 in accordance with an embodiment of the present invention. As shown in FIG. 15, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 15, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 15, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 15, a system may implement a multi-drop bus or other such architecture.

Figure 16:
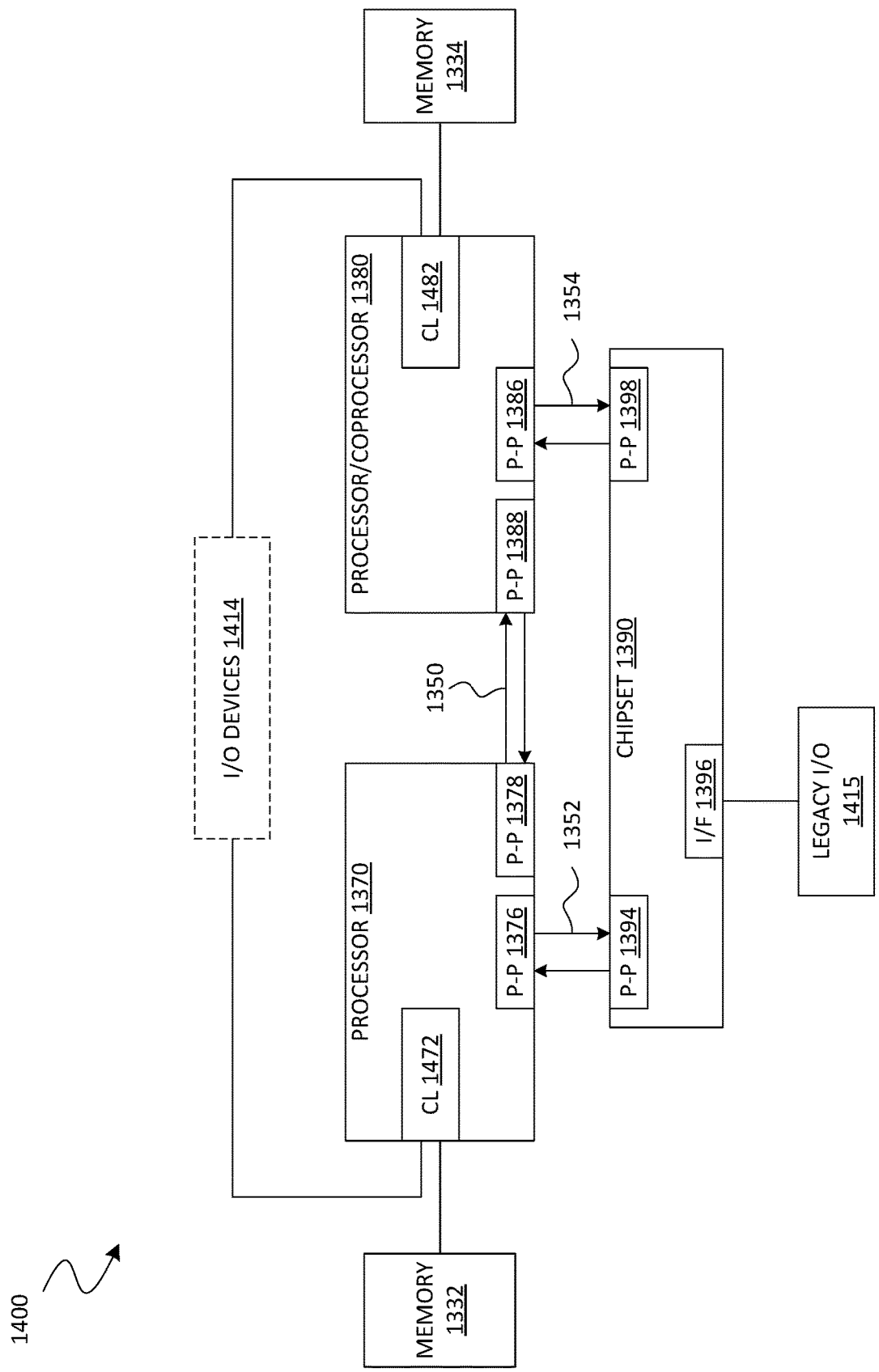

Referring now to FIG. 16, shown is a block diagram of a second more specific exemplary system 1400 in accordance with an embodiment of the present invention Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1370, 1380 may include integrated memory and I/O control logic ("CL") 1472 and 1482, respectively. Thus, the CL 1472, 1482 include integrated memory controller units and include I/O control logic. FIG. 16 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 17, shown is a block diagram of a SoC 1500 in accordance with an embodiment of the present invention. Similar elements in FIG. 13 bear like reference numerals. Also, dashed lined boxes are optional features on more advanced SoCs. In FIG. 17, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 18 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for retrieving state information to be saved to a crash log are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
  a branch predictor to predict whether a conditional branch is taken for one or more instructions, the branch predictor including circuitry to:
    identify a loop branch instruction in the one or more instructions, wherein an operand of the loop branch instruction comprises a loop-control variable;
    speculatively calculate a first value of the loop-control variable for a next iteration of the loop branch instruction, comprising extrapolating the first value based on respective values of the loop-control variable from a current iteration of the loop branch instruction and a previous iteration of the loop branch instruction; and
    provide a branch prediction for the loop branch instruction based on a context of the first value.

2. The integrated circuit of claim 1, wherein the circuitry is to provide the branch prediction based on whether the first value indicates that the loop branch instruction will exit a loop at the next iteration of the loop branch instruction.

3. The integrated circuit of claim 1, wherein the circuitry is further to:
save the respective value of the loop-control variable from the previous iteration of the loop branch instruction.

4. The integrated circuit of claim 3, wherein the circuitry is further to:
store an array of entries that each correspond to a respective loop branch instruction.

5. The integrated circuit of claim 4, wherein an entry of the array includes a tag field calculated by the circuitry to identify loop branches, a field to store a previous value of a first loop-control variable, a prediction field with a predicted branch direction in terms of "taken" or "not taken", a validity field to indicate a validity of the entry, and a usage field to store a usage information for entry replacement selection.

6. A method, comprising:
processing one or more instructions by a branch prediction unit;
identifying a loop branch instruction in the one or more instructions, wherein an operand of the loop branch instruction comprises a loop-control variable;
speculatively calculating a first value of the loop-control variable for a next iteration of the loop branch instruction, comprising extrapolating the first value based on respective values of the loop-control variable from a current iteration of the loop branch instruction and a previous iteration of the loop branch instruction; and
providing a branch prediction for the loop branch instruction based on the first value.

7. The method of claim 6, further comprising:
providing the branch prediction based on whether the first value indicates that the loop branch instruction will exit a loop at the next iteration of the loop branch instruction.

8. The method of claim 6, further comprising:
saving the respective value of the loop-control variable from the previous iteration of the loop branch instruction.

9. The method of claim 8, further comprising:
storing an array of entries that each correspond to a respective loop branch instruction.

10. The method of claim 9, wherein an entry of the array includes a tag field calculated from a branch instruction pointer to identify loop branches, a field to store a previous value of a first loop-control variable, a prediction field with a predicted branch direction in terms of "taken" or "not taken", a validity field to indicate a validity of the entry, and a usage field to store usage information for entry replacement selection.

11. An electronic apparatus, comprising:
a front end unit to fetch and decode one or more instructions; and
an execution unit communicatively coupled to the front end unit to execute the one or more instructions and provide information to the front end unit,
wherein the front end unit includes a branch prediction unit to predict whether a branch is taken for the one or more instructions, the branch prediction unit including circuitry to:
identify a loop branch instruction in the one or more instructions, wherein an operand of the loop branch instruction comprises a loop-control variable;
speculatively calculate a first value of the loop-control variable for a next iteration of the loop branch instruction, comprising extrapolating the first value based on respective values of the loop-control variable from a current iteration of the loop branch instruction and a previous iteration of the loop branch instruction; and
provide a branch prediction for the loop branch instruction based on the first value.

12. The electronic apparatus of claim 11, wherein the circuitry is to provide the branch prediction based on whether the first value indicates that the loop branch instruction will exit a loop at the next iteration of the loop branch instruction.

13. The electronic apparatus of claim 11, wherein the circuitry is further to:
store respective loop-control variable values from previous iterations of loop branch instructions in an array of entries that each correspond to a respective loop branch instruction.

14. The electronic apparatus of claim 13, wherein an entry of the array includes a tag field calculated by the circuitry to identify loop branches, a field to store a previous value of a first loop-control variable, a prediction field with a predicted branch direction in terms of "taken" or "not taken", a validity field to indicate a validity of the entry, and a usage field to store usage information for entry replacement selection.

* * * * *